United States Patent [19]

Verborg et al.

[11] Patent Number: 5,100,031

[45] Date of Patent: Mar. 31, 1992

[54] METHOD AND APPARATUS FOR DOSING AND DISPENSING MERCURY INTO DISCHARGE LAMPS

[75] Inventors: Philippe Verborg, Boutersem, Belgium; Nanu Brates, Malden; James C. Morris, Wakefield, both of Mass.

[73] Assignee: GTE Products Corporation, Danvers, Mass.

[21] Appl. No.: 238,792

[22] Filed: Aug. 31, 1988

[51] Int. Cl.⁵ ............................................. G01F 11/00
[52] U.S. Cl. ................................... 222/335; 358/107; 222/263; 222/399
[58] Field of Search ............... 222/263, 282, 335, 394, 222/399, 204, 416, 603, 420, 422; 358/107

[56] References Cited

U.S. PATENT DOCUMENTS

| | | | |
|---|---|---|---|
| 1,650,210 | 11/1927 | Hasty | 222/263 |
| 3,223,291 | 12/1965 | Thomas | 222/335 |
| 3,320,053 | 5/1967 | Lehman | 222/603 |
| 3,771,366 | 11/1973 | Thulin | 222/335 |
| 3,847,581 | 11/1974 | Peters et al. | 73/290 R |
| 3,908,077 | 9/1975 | Stut et al. | 358/107 |
| 4,319,568 | 5/1982 | Tregoning | 222/64 |
| 4,731,650 | 5/1988 | Hadfield et al. | 358/107 |

*Primary Examiner*—H. Grant Skaggs
*Attorney, Agent, or Firm*—Carlo S. Bessone

[57] ABSTRACT

An apparatus and method for accurately dosing and dispensing mercury. The apparatus includes a reservoir containing mercury and a capillary tube extending from the reservoir of mercury to a dispensing needle and having an inlet located intermediate a pair of remotely located ends. The apparatus adjusts the height of a column of the mercury within the capillary tube and measures the height of the mercury column. In one embodiment, a digital vision system comprising a TV camera and monitor digitizes the image of the mercury column within the capillary tube and automatically determines the height of the column. A source of gas is supplied to the inlet in the capillary tube such that a predetrmined amount of mercury is separated from the mercury column and dispensed from the other one of the remotely located ends of the capillary tube.

25 Claims, 7 Drawing Sheets

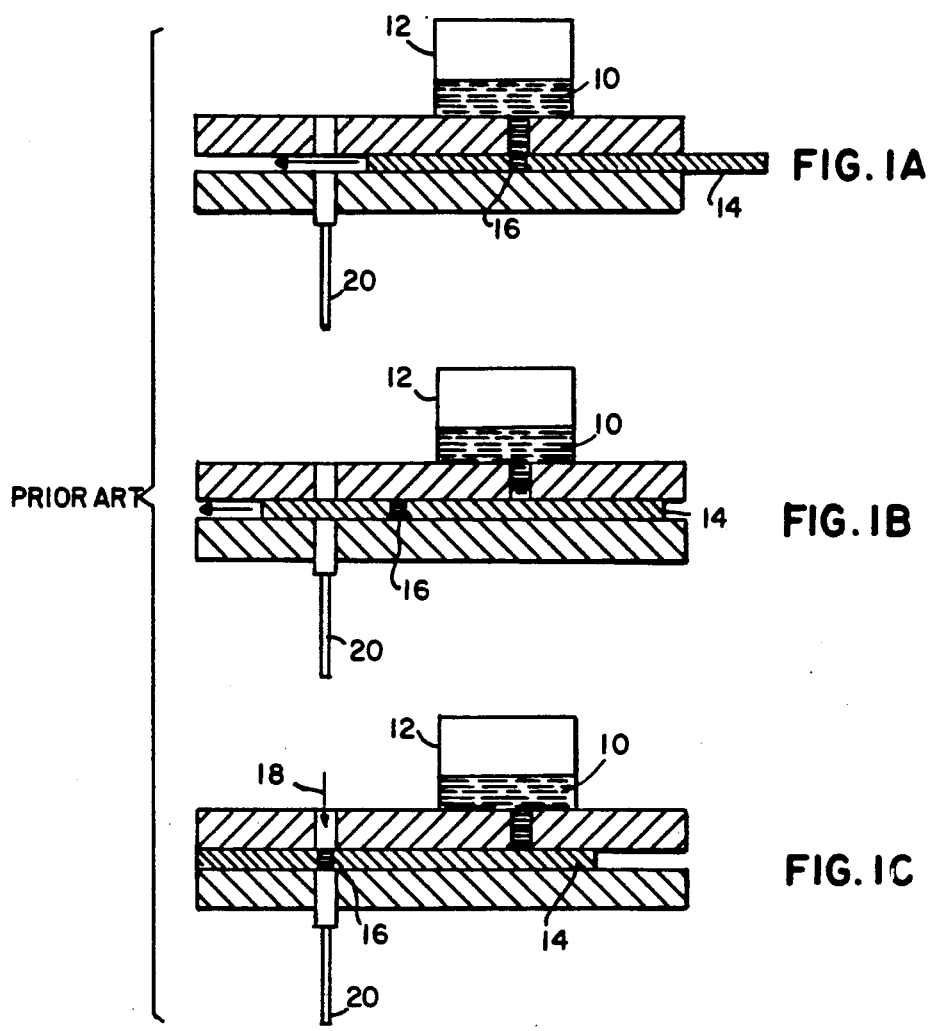
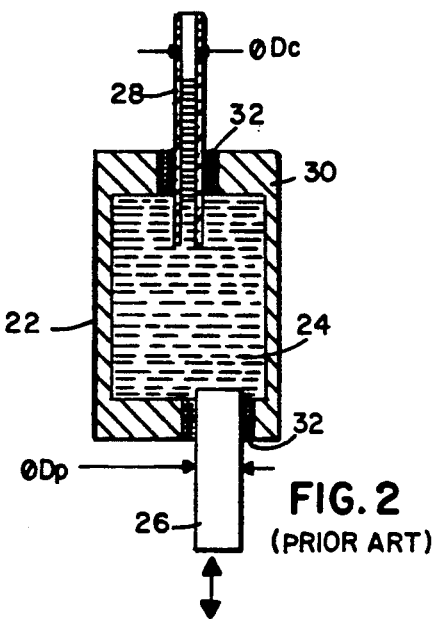

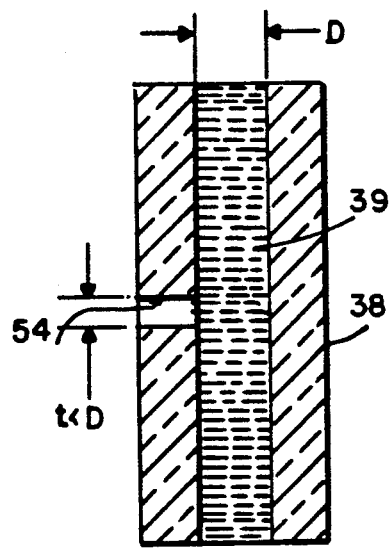
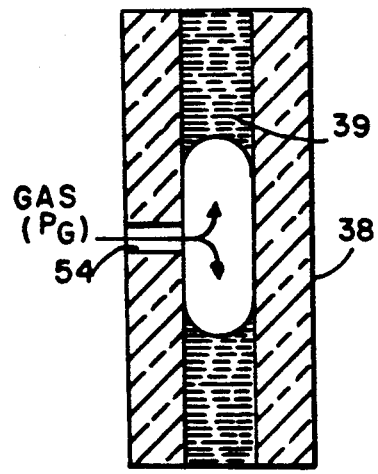
FIG. 4A  FIG. 4B
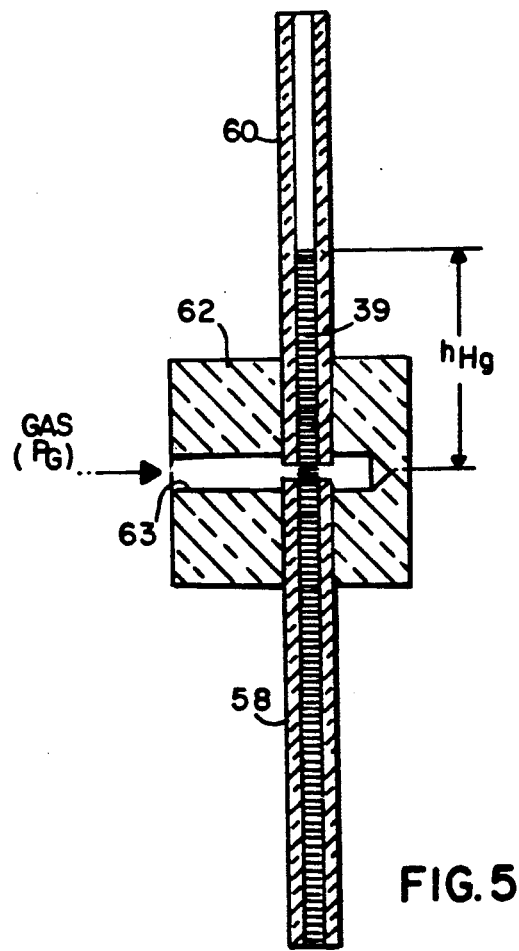
FIG. 5

METHOD AND APPARATUS FOR DOSING AND DISPENSING MERCURY INTO DISCHARGE LAMPS

TECHNICAL FIELD

This invention relates to an method and apparatus for dosing and dispensing a precise amount of a particular material. More particularly, this invention relates to the dosing and dispensing of small amounts of liquid mercury into discharge lamps. The invention is based on the measurement and control of the height of the mercury column within a capillary tube and the precise separating and dispensing of a portion of the mercury column.

BACKGROUND OF THE INVENTION

Many types of discharge lamps, such as HID lamps (e.g., mercury, metal halides, etc.) as well as fluorescent lamps (i.e., low pressure mercury), include mercury in their chemical fills. Typically, the mercury dose is dispensed as a liquid, with the exception of high pressure sodium lamps, where mercury is added as Na:Hg amalgam (i.e., solid form).

During the lamp manufacturing process, the dosing of liquid mercury is typically done by weight or by volume. For volumetric dosing, the required amount of mercury "$m_{Hg}$" (in mg), is dispensed into the arc vessel using the following relationship:

$$V = m_{Hg}/\rho_{Hg} \qquad (1)$$

where, V = volume of the mercury dose and $\rho_{Hg}$ = mercury density.

Therefore, instead of weighing each individual dose, one fills a cavity (of volume $V = m_{Hg}/\rho_{Hg}$) with mercury, which is subsequently dispensed into the arc capsule.

One of the most commonly used methods for introducing mercury is a mechanical slide dispenser shown in FIGS. 1A, 1B, 1C which forms part of the exhaust machine used in manufacturing HID lamps. Mercury 10 contained within a reservoir 12 is dispensed by the action of a slide plate 14 provided with a hole which separates a calibrated volume of mercury 16 from reservoir 12. Slide plate 14 moves horizontally (FIG. 1B) until the separated volume of mercury 16 is positioned over a dispensing needle 20 as shown in FIG. 1C. A flow of inert gas 18 dispenses the volume of mercury 16 through dispensing needle 20 and into the exhaust tube of the lamp.

Although this technique of dispensing mercury is simple and easy to implement, it is difficult to employ in cases where the required amount of mercury has to be adjusted for each arc capsule. This is the case with low wattage metal halide lamps, where due to large manufacturing tolerance of the volume of the arc capsule, each capsule is filled with an individual mercury dose. As a result, the task of dosing metal halide lamps with mercury is quite complicated requiring the following four steps to be followed: (a) measure the arc tube volume, (b) determine the required amount of mercury from a calibration curve or from a table, (c) weigh the required amount of mercury, and (d) dispense the mercury dose into the arc tube. The entire filling process is manual, prone to operator error, and slow. The accuracy of a mechanical slide dispenser varies typically between 5 to 50%.

Another approach for dosing and dispensing mercury as illustrated in FIG. 2 is to utilize a volumetric displacement type mercury dispenser. One known method is to employ a syringe 22 which contains a reservoir of mercury 24 and is provided with a micrometer driven plunger 26. A dispensing needle 28 (having an inner diameter $D_c$) located at one end of syringe 22 together with plunger 26 are sealed to the mercury container 30 by means of a pair of seals 32. The volumetric displacement of the plunger 26 determines the dosing amount. More specifically, the volume of mercury 24 displaced by plunger 26 is:

$$V = 1 \times \pi \times D_p^2/4 \qquad (2)$$

where V [mm$^3$] = displaced volume, $D_p$ = plunger diameter and 1 = plunger displacement.

For example, with the density of mercury $\rho_{Hg} = 13.55$ mg/mm$^3$ at 20° C., the volume corresponding to 14.00 mg is 1.033 mm$^3$. To achieve a dispense accuracy of 1%, one has to be able to control a volume of at least 0.0103 mm$^3$ with the plunger. The minimum displacement 1 which one can achieve with a micrometer arrangement is typically 0.005 mm (0.0002"). Thus, from Eqn. (2) above we find the plunger diameter:

$$D_p = \sqrt{4 \times V_{Hg}/(\pi \times 1)} = \sqrt{4 \times 0.0103/(\pi \times 0.005)}$$

$$D_p = 1.622 \text{ mm}$$

For a typical stroke of the plunger of 100.0 mm, the maximum volume of mercury ($V_{max}$) that can be dispensed without refilling the reservoir is (from Eqn. (2)):

$$V_{max} = 100 \times \pi \times 1.622^2/4 \approx 201 \text{ mm}^3$$

In other words, with a mean volume for one dispense of 1.03 mm$^3$, only 201/1.03 ≈ 195 dispenses (or lamps) can be made before the mercury reservoir has to be refilled. The disadvantages of this method is the limited number of dispenses, the need for an accurate (and thus expensive) plunger and plunger drive mechanism. Moreover, in order to prevent gas from being trapped inside the reservoir the system has to be outgassed every time the container is refilled with mercury. Also, this method of dispensing mercury is only about 3-8% accurate.

The mercury dispensing system of the present invention is fully automatic. Thus, it can easily be interfaced with the lamp manufacturing process. The mechanical construction of the dispenser is simple and has essentially, no moving parts. In addition, typical accuracies of from about 0.2-1.0% can readily be achieved.

SUMMARY OF THE INVENTION

It is, therefore, an object of the present invention to obviate the disadvantages of the prior art.

It is another object of the invention to enhance the art of dosing and dispensing mercury.

It is still another object of the invention to provide an improved apparatus for dosing and dispensing mercury.

It is a further object of the invention to provide an improved method for dosing, separating and dispensing mercury which is more accurate than prior methods.

These objects are accomplished in one aspect of the invention by the provision of an apparatus for dosing and dispensing mercury comprising a reservoir containing mercury and a capillary tube means having a predetermined internal diameter and extending from the reservoir of mercury. The capillary tube means has remotely located ends and an inlet located intermediate the ends. One of the ends is located within the reservoir. The apparatus further includes means for adjusting the height of a column of mercury within the capillary tube means and means for measuring the height of the mercury column. Means are provided for separating and dispensing a predetermined amount of mercury from the mercury column and includes a source of gas supplied to the inlet in the capillary tube means such that the predetermined amount of mercury is separated from the mercury column and dispensed from the other of the remotely located ends of the capillary tube means.

In accordance with further teachings of the present invention, the capillary tube means is a single capillary tube. In a second embodiment, the capillary tube means includes first and second capillary tubes, one end of each of the capillary tubes is spaced a predetermined distance thereapart and coupled together by a block means.

In accordance with further aspects of the present invention, the means for adjusting the height of the mercury column within the capillary tube means includes a source of pressurized gas connected to the mercury reservoir.

In accordance with still further teachings of the present invention, the means for measuring the height of the mercury column within the capillary tube means includes a cathetometer. In a second embodiment, the measuring means comprises a coaxial capacitor means including a first electrode formed by a metal foil surrounding the capillary tube means and a second electrode formed by the mercury column within the capillary tube means. In this embodiment, the output signal from the coaxial capacitor means is proportional to the height of the mercury column. In a third embodiment, the measuring means comprises an electromagnetic coil means surrounding the capillary tube means. The output signal from the electromagnetic coil means is proportional to the height of the mercury column. In a fourth embodiment, the means for measuring the height of the mercury column comprises an optical system means including a light source and a photodetector means arranged on opposite sides of the mercury column such that the output signal of the photodetector means is inversely proportional to the height of the mercury column. In a fifth embodiment, the measuring means comprises an optical system means including a light source and a photodetector means arranged such that the output signal of the photodetector means is proportional to the height of the mercury column. In a sixth embodiment, the measuring means comprises a digital vision system means including a TV camera.

In accordance with another aspect of the invention, there is defined a method for dosing and dispensing mercury comprising the steps of providing a reservoir containing mercury and a capillary tube means having a predetermined internal diameter and extending from the reservoir of mercury. The capillary tube means has remotely located ends and an inlet intermediate the ends. One of the ends is located within the reservoir. The height of the mercury column within the capillary tube means is adjusted and a predetermined amount of mercury in the mercury column within the capillary tube means is measured. A source of gas is supplied to the inlet in the capillary tube means such that the predetermined amount of mercury is separated from the mercury column and dispensed from the other one of the remotely located ends of the capillary tube means.

BRIEF DESCRIPTION OF THE DRAWINGS

The invention will become more readily apparent from the following exemplary description in connection with the accompanying drawings, wherein:

FIGS. 1A, 1B and 1C are schematics of a mechanical slide dispenser known in the art;

FIG. 2 is a schematic of a volumetric displacement type mercury dispenser known in the art;

FIGS. 4A and 4B are enlarged views of a method for separating (i.e., splitting) the mercury column employing a single capillary tube;

FIG. 5 is a view of an alternative method for separating the mercury column employing two capillary tubes coupled together by a rigid block;

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 3:
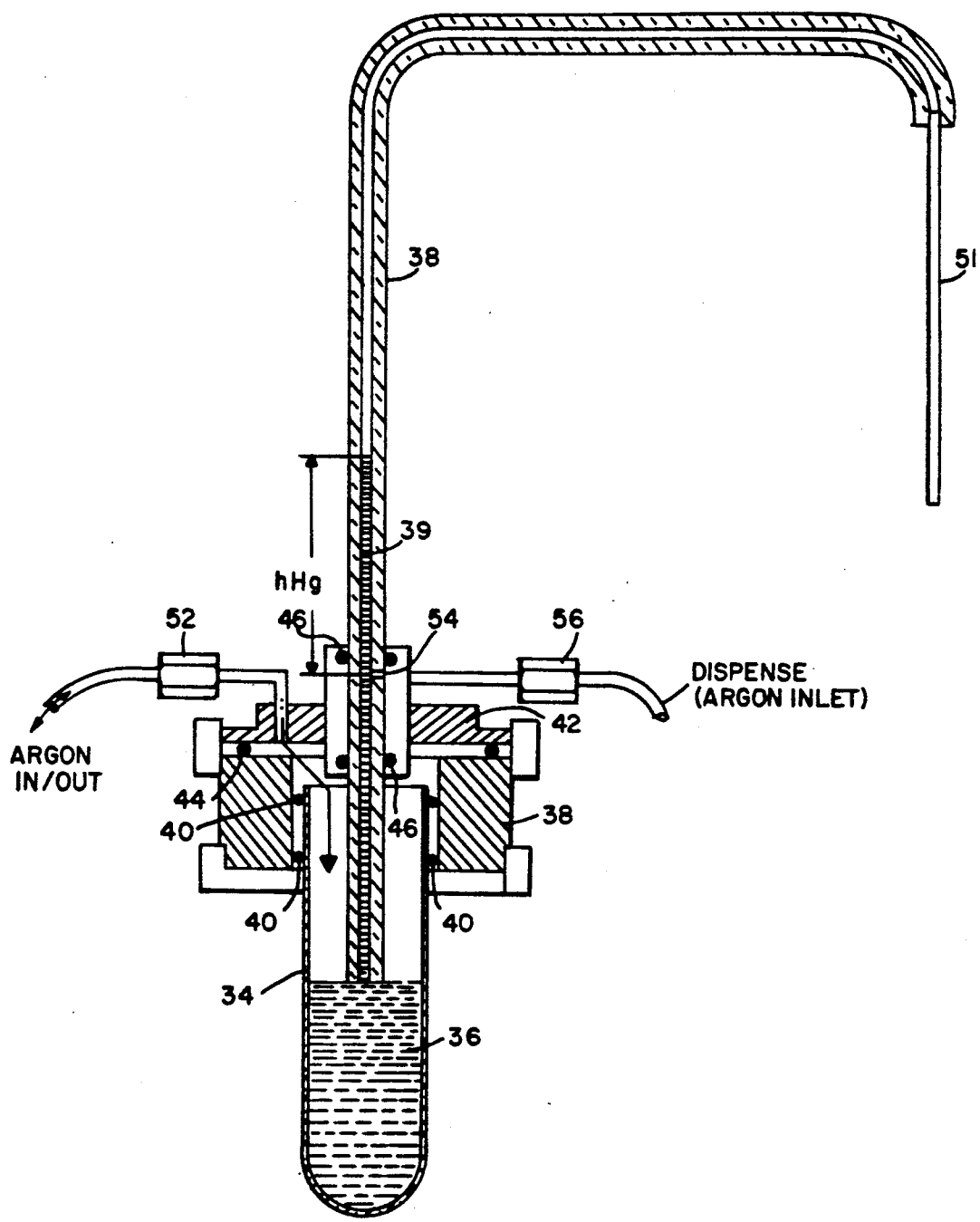
FIG. 3 is a front elevational view of an embodiment of the mercury dispensing apparatus of the present invention utilizing a single capillary tube having a side hole for separating the mercury column.

Referring to the drawings with greater particularity, FIG. 3 illustrates one embodiment of the dispensing apparatus of the present invention. The apparatus includes a reservoir 34 which can be made of glass containing a supply of a liquid material 36 such as mercury. The upper portion of reservoir 34 is sealed to a lower block member 38 by means of a pair of O-rings 40. An upper block member 42 is sealed to the upper surface of lower block member 38 by an O-ring 44. A piece of capillary glass tubing 38 extends through apertures formed in upper block member 42 and lower block member 38. The capillary tube 38 is secured to upper block plate 42 by means of a pair of O-rings 46. One end of capillary tubing 38 enclosed within container 36 is immersed in the mercury while the other end extends from the container and may be coupled to a dispensing needle 51. A mercury column 39 having a constant cross-section equal to the internal diameter D of the capillary tube is formed. Thus, with Eqn. (1), the volume, corresponding to the required mercury dose $m_{Hg}$, is $$V = m_{Hg}/\rho_{Hg} = h_{Hg} \times \pi \times D^2/4 \quad (3)$$

or $$m_{Hg} = \pi \times \rho_{Hg} \times D^2 \times h_{Hg}/4 = K \times h_{Hg} \quad (4)$$

where $h_{Hg}$ = height of the mercury column 39 (FIG. 3), D = internal diameter of the capillary tube, and K is a constant characterizing the column.

The amount of the mercury dose is adjusted by adjusting the height, $h_{Hg}$, of the mercury column. The height of the mercury column is controlled by varying the pressure above the mercury pool within container 36. The pressure above the mercury pool within the container is controlled by means of a cylinder of pressurized gas (e.g., argon) which is connected to inlet 52 on upper block member 42.

Means are provided to separate (or split) the mercury column, such that only the required amount of mercury is dispensed from the capillary tube. Preferably, the mercury is separated from the mercury column by a method we refer to as a "gas blade" (or knife) cutting technique. In the embodiment illustrated in FIGS. 3, 4A and 4B, a hole 54 drilled through the wall of capillary tube wall 38 provides access to the mercury column. A source of compressed gas (not shown) is connected to inlet 56 in upper block member 42 (FIG. 3) which is coupled to hole 54 and causes the mercury column within the capillary tube to split such that the two resulting segments move apart as best illustrated in FIG. 4B. To prevent mercury from escaping through the hole 54, the diameter t of hole 54 should be smaller than the capillary bore D (FIG. 4A).

For a capillary bore of typically 0.25 mm (0.010"), a side hole of about 0.15 mm (0.006") is drilled. A $CO_2$ pulsed laser may be employed to bore the capillary hole through the tube wall. With proper laser pulse width and intensity, it is possible to bore a nearly cylindrically hole.

An alternative method of employing the "gas blade" (or knife) cutting technique of separating the mercury column is illustrated in FIG. 5. Two separate pieces of capillary tubing 58, 60 are assembled together in a rigid block 62, such as polycarbonate. Rigid block 62 contains a cylindrical hole 63 which as shown in FIG. 5, extends through block 62 on both sides of mercury column 39. By pressurizing the gap volume with gas ($P_G$) by way of the hole 63, the mercury column splits causing the two resulting segments to move apart.

The mercury column separation takes place only if the gas pressure satisfies one of the following conditions Eqns. (4) or (5).

(a) Vertical Operation $$P_g{}^V \times A > m_{Hg} \times g + F_\Sigma \quad (4)$$

or $$P_g{}^V > \rho_{Hg} \times h_{Hg} \times g + 4 \times F_\Sigma/(\pi \times D^2)$$

(b) Horizontal Operation $$p_g{}^H > 4 \times F_\Sigma/(\pi \times D^2) \quad (5)$$

where $p_g{}^{V,H}$ = gas pressure for vertical and horizontal operation, respectively, g = gravity constant = 9.8 m/s$^2$, and $F_\Sigma$ = sum of all friction and adhesion forces characterizing the mercury-capillary interface.

Figure 6:
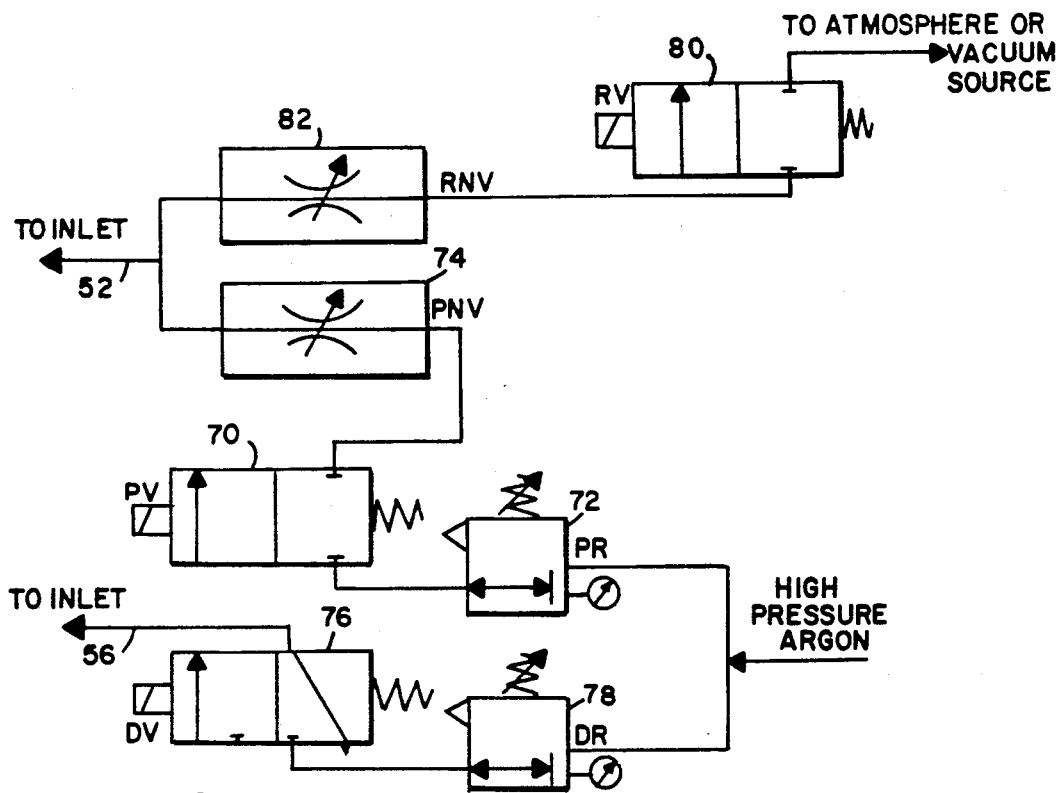
FIG. 6 is an embodiment of a mercury dispenser valving system.

To regulate the height of the mercury column, the pressure above the mercury pool (FIG. 3) is controlled by using the valving system illustrated in FIG. 6. Upon energizing pressure valve 70, the pressure inside the mercury reservoir 34 (in FIG. 3) increases, such that the mercury column rises inside the capillary tube. The rate of rise of the mercury column is controlled by gas pressure regulator 72 and by adjusting the gas flow using a needle valve 74. When the desired mercury column height is reached, valve 70 is de-energized. The predetermined amount of mercury is separated from the mercury column and eventually dispensed through the dispensing needle by energizing valve 76. The gas pressure for dispensing is controlled with pressure regulator 78.

Due to inertial and friction forces, the mercury column has a tendency to continues to rise. To correct for the overshoot, the container pressure is reduced by opening relief valve 80 to atmosphere, or to a vacuum "source". The rate of lowering the mercury column within the capillary tube is controlled by adjusting the gas flow utilizing needle valve 82.

For the first embodiment of the dispenser, the mercury height was detected utilizing a cathetometer (i.e., telescope and vernier), while adjustment was achieved by manual control of the valving system illustrated in FIG. 6. Cathetometers have been used in the past to measure the height of a liquid. The experimental results obtained employing a 0.305 mm (0.012") diameter capillary and manual control are illustrated in TABLE I.

TABLE I

| No. | Weight of the container and the dispensed Hg [mg] | Mass dispensed [mg] |
| --- | --- | --- |
| 0 | 0.50991 | — |
| 1 | 0.52758 | 17.67 |
| 2 | 0.54530 | 17.72 |
| 3 | 0.56306 | 17.76 |
| 4 | 0.58087 | 17.81 |
| 5 | 0.59868 | 17.81 |
| 6 | 0.61667 | 17.99 |
| 7 | 0.63454 | 17.87 |
| 8 | 0.65226 | 17.72 |
| 9 | 0.67003 | 17.77 |
| 10 | 0.68781 | 17.78 |
| 11 | 0.70561 | 17.80 |
| 12 | 0.72342 | 17.81 |
| 13 | 0.74111 | 17.69 |
| 14 | 0.75879 | 17.68 |
| 15 | 0.77660 | 17.81 |
| 16 | 0.79434 | 17.74 |
| 17 | 0.81202 | 17.68 |
| 18 | 0.82970 | 17.68 |
| 19 | 0.84742 | 17.72 |
| 20 | 0.86516 | 17.74 |

Statistical analysis of the above measurements is shown below:

$\overline{m}$ = 17.76 mg
$m_{max}$ = 17.99 mg
$m_{min}$ = 17.67 mg
range = $m_{max} - m_{min}$ = 0.32 mg
$\sigma$ = 0.078 mg Accuracy is defined as being the largest of $m_{max}/\overline{m} - 1$ or $1 - m_{min}/\overline{m}$ which in this case equals 1.3%.

To automate the entire dispensing procedure and to improve the dosing accuracy, electronic or electro-optical detection systems can be used to measure the height of the mercury column.

Figure 7:
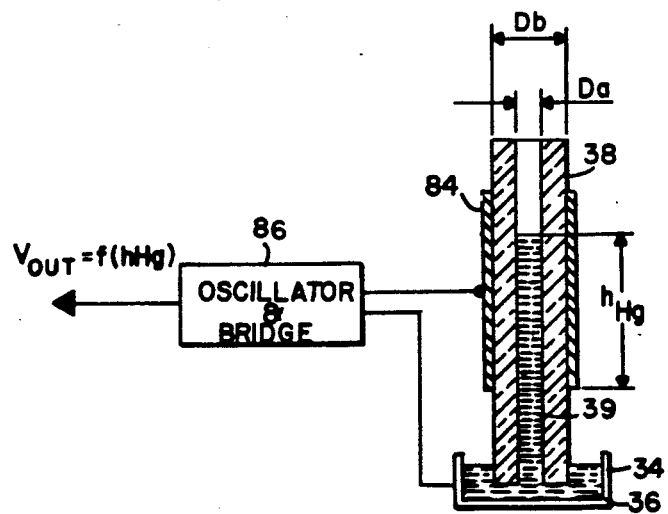
FIG. 7 is an embodiment of a means for measuring the height of the mercury column within the capillary tube employing capacitor.

The second embodiment of a system for detecting the height of the mercury column within the capillary tube is illustrated in FIG. 7. A coaxial capacitor is provided with one electrode thereof formed by a metal foil 84 surrounding capillary tube 38. The second electrode of the capacitor is the mercury column itself. The two electrodes are electrically connected to an oscillator and bridge circuit 86.

The capacitance of the device is a linear function of the height of the mercury column:

$$C = h \times (2\pi \times \epsilon_o \times \epsilon_r)/\ln(D_b/D_a) \quad (6)$$

where h=height of the mercury column, $\epsilon_o = 8.85 \times 10^{-12}$ [F/m] (vacuum permittivity), $\epsilon_r$=glass permittivity, $D_b$, $D_a$=outer and inner diameter of the capillary tube, respectively).

For a typical glass capillary, $D_b = 6.0$ mm, $D_a = 0.2$ mm, $\epsilon_r = 7$. Thus, from Eqn. (6)

$$h \,[mm] = 8.738 \times C \,[pf] \quad (7)$$

Thus, one measures the capacitance in order to determine the height of the mercury column.

Figure 8:
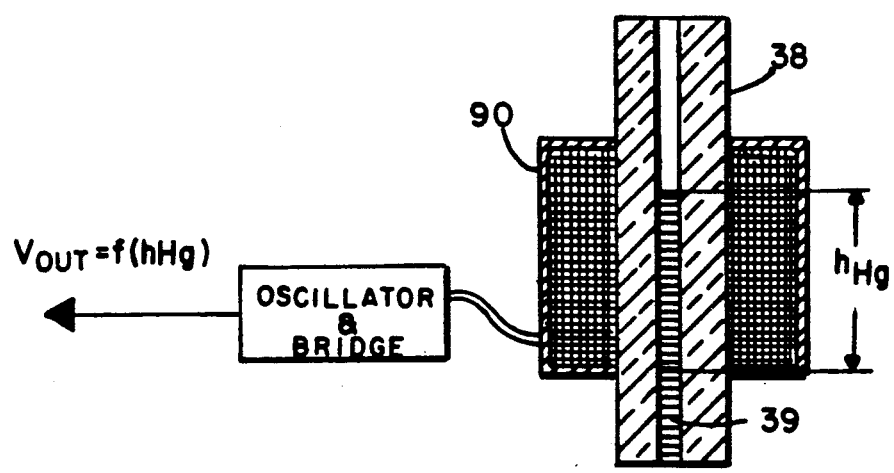
FIG. 8 is another embodiment of a means for measuring the height of the mercury column employing an electromagnetic coil.

Another embodiment of a mercury height measuring device is illustrated in FIG. 8. The measuring principle is based on the detection of the variation of the magnetic field generated by a coil 90 which surrounds capillary tube 38, due to the presence of the metallic mercury column within the capillary tube 38. The output of the detector is:

$$V_{out} = f(h_{Hg})$$

Figure 9:
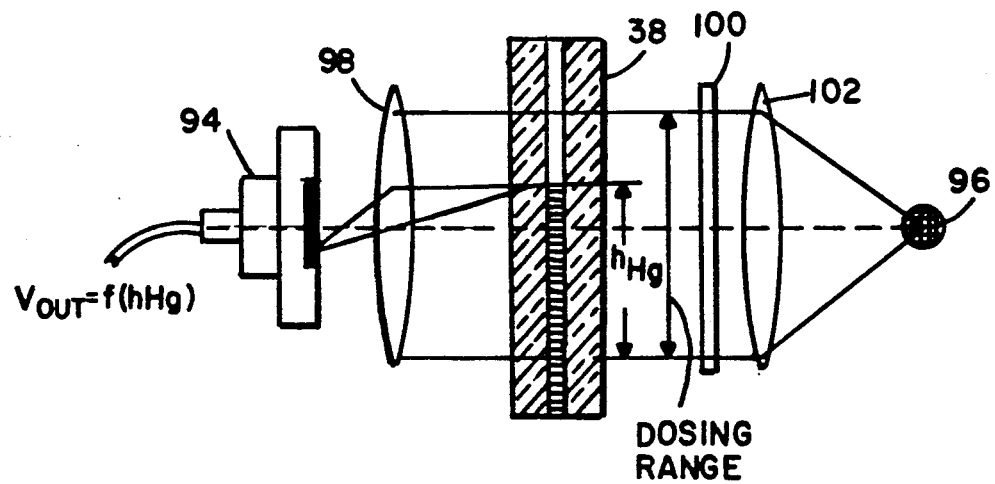
FIG. 9 is still another embodiment of a means for measuring the height of the mercury column employing an optical detection system.

FIG. 9 illustrates an embodiment using an optical system for detecting the height of the mercury column. The mercury column is positioned between a photodetector 94 and a light source 96. The image of the mercury column is projected, by means of a cylindrical lens 98, onto the large photodetector sensitive surface. A diffuser 100 and a cylindrical collimator lens 102 are positioned between the capillary tube 38 and light source 96. The photodetector output signal is inversely proportional to the height of the mercury column. As the column height increases, more area of the photodetector surface is being obscured by the column image, thus less photodetector output signal. Thus, $$V_{out} = f^{-1}(h_{Hg}).$$

Figure 10:
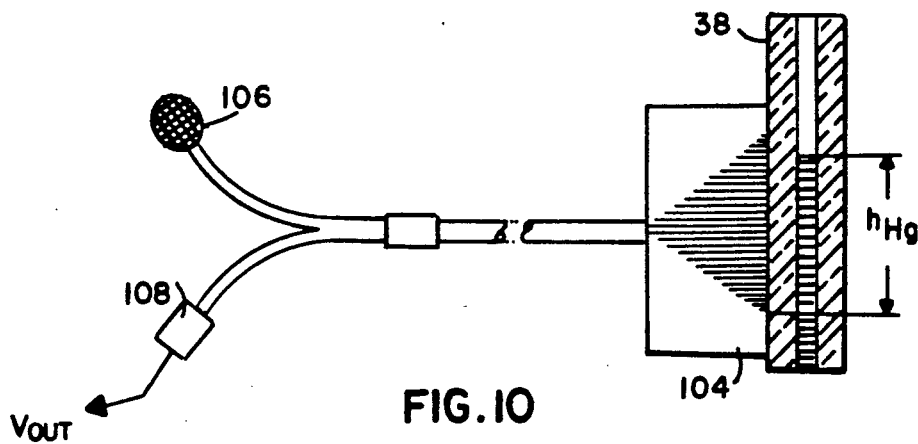
FIG. 10 is another optical detection system for measuring the column height using fiber optic cable.

Another embodiment of optical detection system is for measuring the height of the mercury column is shown in FIG. 10. A bifurcated fiber optic bundle is linked to a linear fiber optic randomized (i.e., multimode) array 104 positioned adjacent the mercury column. One half of the fiber optic bundle is linked to a light source (e.g., LED) 106 while the other half of the fiber bundle is linked to a photodetector 108. The mercury column acts as a reflecting surface such that part of the light generated by source 106 is retro-reflected and detected by the photodetector 108.

Thus, the higher the mercury column, the more light is reflected back. A larger detector output will result since $$V_{out} = f(h_{Hg}).$$

Figure 11:
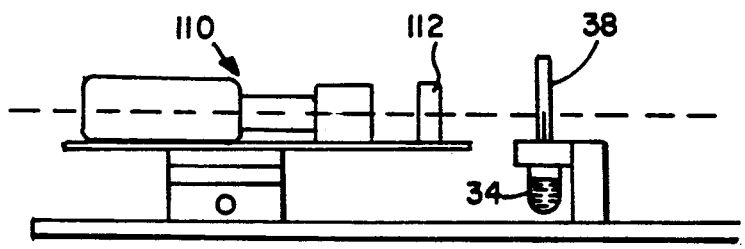
FIG. 11 is yet another embodiment of a means for measuring the height of the mercury column employing a digital vision system.
Figure 12:
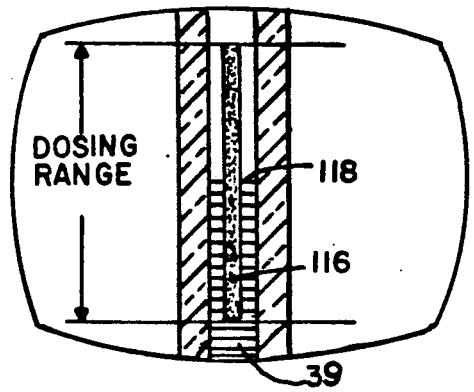
FIG. 12 is a digitized image of the capillary tube and mercury column which is displayed on the monitor of the vision system in FIG. 11.

Another embodiment of opt detection includes a digital vision system as illustrated in FIG. 11. Digital vision systems have been used in the past for calculating an area of an object or for determining the orientation of an object. In accordance with the teachings of the present invention, a TV camera 110 constantly monitors the height of the mercury column within the capillary tube 38. The vision system digitizes the image of the capillary and determines the extent of the mercury column. A typical digitized image, displayed on the system TV monitor is shown in FIG. 12. The vision system determines the mercury column height by counting the number of pixels contained within a vertical window 116 which is superimposed over an image of the mercury column 39. The height of the mercury column is measured from the bottom of the window to the black-white transition 118. This transition represents the top of the mercury column. To ensure a higher resolution of the imaging system a cylindrical lens 112 (FIG. 11), positioned parallel to the capillary tube, may be employed to magnify the width of the mercury column.

Figure 13:
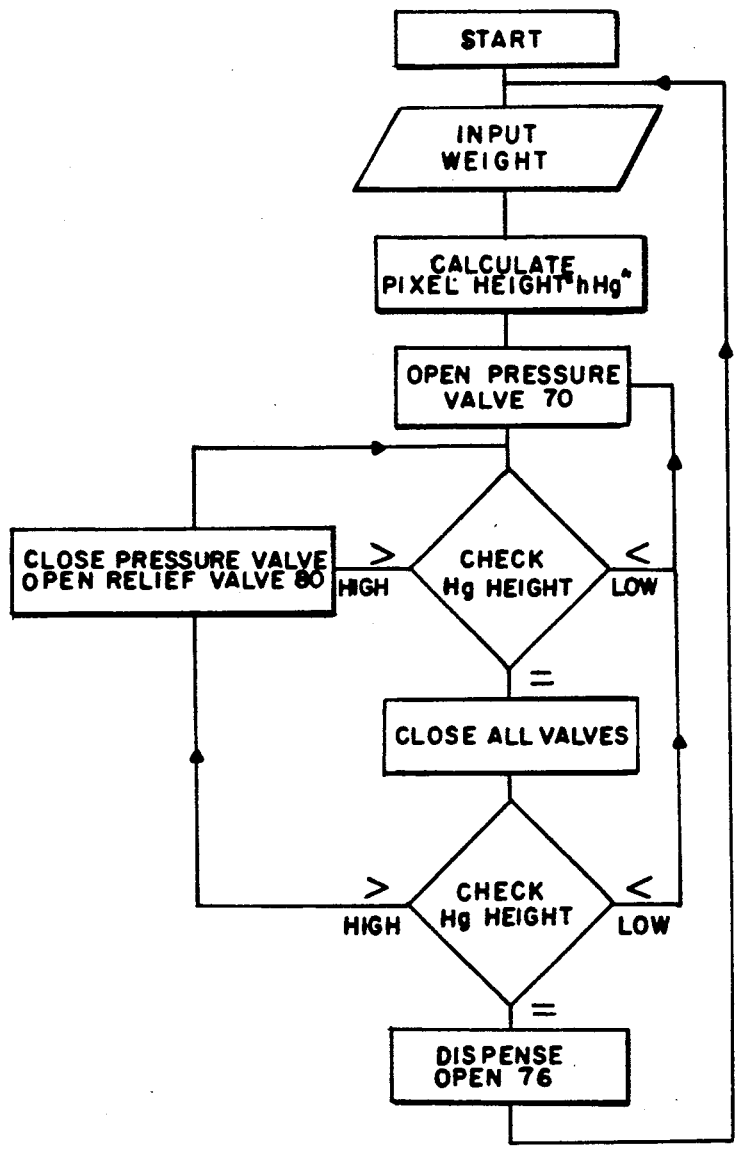
FIG. 13 is a flow chart of the mercury dosing and dispensing process of the present invention.

The vision system employed is based on a microprocessor, such that the entire dosing and dispensing process can be fully automatized. A simplified instructions flow chart for controlling the valving system of FIG. 6 is shown in FIG. 13.

Measurements obtained for five consecutive dispenses, illustrated in TABLE II, are shown together with the statistical analysis results.

TABLE II

| Height: 10H pixels | | Height: 50H pixels | | Height: 90H pixels | | Height: 70H pixels | | Height: 30H pixels | |
|---|---|---|---|---|---|---|---|---|---|
| Reading | Weight | Reading | Weight | Reading | Weight | Reading | Weight | Reading | Weight |
| 0.00000 | — | 0.00000 | — | 0.00000 | — | 0.00000 | — | 0.16440 | — |
| 0.01488 | 14.88 | 0.01591 | 15.91 | 0.01698 | 16.98 | 0.01644 | 16.44 | 0.17978 | 15.38 |
| 0.02972 | 14.84 | 0.03183 | 15.92 | 0.03394 | 16.96 | 0.03289 | 16.45 | 0.19516 | 15.38 |
| 0.04459 | 14.87 | 0.04777 | 15.94 | 0.05090 | 16.96 | 0.04933 | 16.44 | 0.21055 | 15.39 |
| 0.05945 | 14.86 | 0.06370 | 15.93 | 0.06786 | 16.96 | 0.06578 | 16.45 | 0.22594 | 15.39 |
| 0.07429 | 14.84 | 0.07961 | 15.91 | 0.08483 | 16.97 | 0.08222 | 16.44 | 0.24135 | 15.41 |
| 0.08918 | 14.89 | 0.09554 | 15.93 | 0.10179 | 16.96 | 0.09865 | 16.43 | 0.25674 | 15.39 |
| 0.10403 | 14.85 | 0.11145 | 15.91 | 0.11875 | 16.96 | 0.11509 | 16.44 | 0.27217 | 15.43 |
| 0.11888 | 14.85 | 0.12739 | 15.94 | 0.13574 | 16.99 | 0.13153 | 16.44 | 0.28755 | 15.38 |
| 0.13375 | 14.87 | 0.14330 | 15.91 | 0.15269 | 16.95 | 0.14796 | 16.43 | 0.30294 | 15.39 |
| 0.14859 | 14.84 | 0.15924 | 15.94 | 0.16967 | 16.98 | 0.16440 | 16.44 | 0.31833 | 15.39 |
| $m_{mean}$ = 14.859 mg | | $m_{mean}$ = 15.924 mg | | $m_{mean}$ = 16.968 mg | | $m_{mean}$ = 16.440 mg | | $m_{mean}$ = 15.393 mg | |
| $m_{max}$ = 14.89 mg | | $m_{max}$ = 15.94 mg | | $m_{max}$ = 16.99 mg | | $m_{max}$ = 16.45 mg | | $m_{max}$ = 15.43 mg | |
| $m_{min}$ = 14.84 mg | | $m_{min}$ = 15.91 mg | | $m_{min}$ = 16.95 mg | | $m_{min}$ = 16.43 mg | | $m_{min}$ = 15.38 mg | |
| range = 0.05 mg | | range = 0.03 mg | | range = 0.04 mg | | range = 0.02 mg | | range = 0.05 mg | |
| $\sigma$ = 0.018 mg | | $\sigma$ = 0.014 mg | | $\sigma$ = 0.017 mg | | $\sigma$ = 0.006 mg | | $\sigma$ = 0.016 mg | |

TABLE II-continued

| Height: 10H pixels | | Height: 50H pixels | | Height: 90H pixels | | Height: 70H pixels | | Height: 30H pixels | |
|---|---|---|---|---|---|---|---|---|---|
| Reading | Weight | Reading | Weight | Reading | Weight | Reading | Weight | Reading | Weight |
| % = ±0.21% | | % = ±0.10% | | % = ±0.18% | | % = 0.06% | | % = 0.24% | |

The heights in TABLE II are given in hexadecimal ("H") representation. "%" is the accuracy as defined directly below TABLE I.

The mercury dispensing system requires calibration in order to establish the relationship between the height of the mercury column and the mass of mercury. Since the mass of mercury is linearly dependent on the height of the mercury capillary column in Eqn. (4), a linear regression relation of the following form was determined:

$$m_{Hg} = A + B \times h_{Hg} \quad (8)$$

Coefficients A and B were determined by using the experimental data presented in TABLE II.

$$A = 14.601 \text{ mg}$$

$$B = 16.453 \times 10^{-3} \text{ mg/pixel}$$

Figure 14:
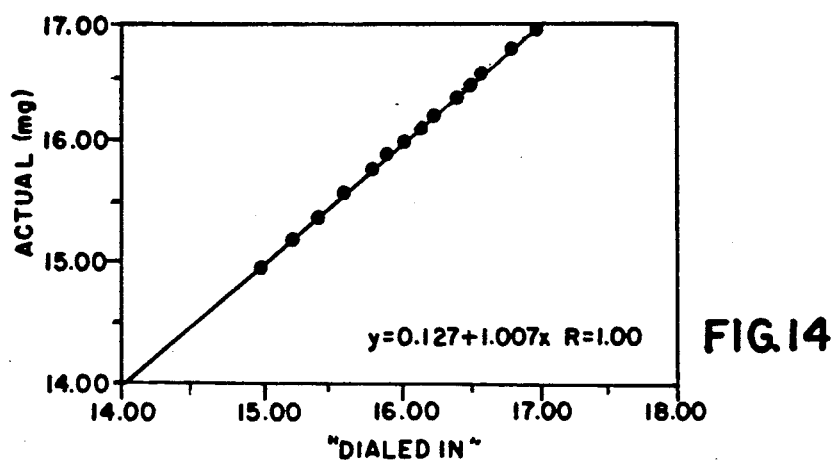
FIG. 14 is a curve employed for the calibration of the mercury dispenser apparatus of the present invention.

These numerical values are valid only for the particular capillary tube utilized, i.e., bore size = 0.254 mm (0.010"). For a different size of the capillary tube bore, a new calibration procedure is required. Nevertheless, the determination of the two coefficients, A and B, requires at least two experimental points, preferably positioned at the two extremes of the dosing range, $h_{min}$ and $h_{MAX}$. The graphical representation of the Eqn. (8) is illustrated in FIG. 14.

Once coefficients A and B are determined the mercury column height ($h_{Hg}$) corresponding to the amount of mercury to be dosed is:

$$h_{Hg} = (m_{Hg} - A)/B \quad (9)$$

In order to dispense, for example, 16.30 mg, according to Eqn. (9):

$$h_{Hg} = (16.30 - 14.60)/16.453 = 103 \text{ pixels}$$

The control system is adjusted such that the dispense took place at a column height of 103 pixels. The weights for two consecutive dispenses were 16.31 mg and 16.30 mg.

The entire dispense process including the calibration procedure and the calculation of the A and B coefficients may be computer controlled so that an operator is only required to enter the desired amount of mercury.

TABLE III illustrates a partial list of dispensing results:

TABLE III

| No. | DIAL WEIGHT [mg] | ACTUAL [mg] | Δ WEIGHT [mg] | ERROR [%] |
|---|---|---|---|---|
| 1 | 15.00 | 14.95 | −0.05 | −0.333 |
| 2 | 16.00 | 16.02 | +0.02 | +0.125 |
| 3 | 16.50 | 16.49 | −0.01 | −0.061 |
| 4 | 15.90 | 15.91 | +0.01 | +0.063 |
| 5 | 16.20 | 16.22 | +0.02 | +0.123 |
| 6 | 16.40 | 16.40 | +0.00 | +0.000 |
| 7 | 16.60 | 16.59 | −0.01 | −0.060 |
| 8 | 16.80 | 16.79 | −0.01 | −0.060 |
| 9 | 17.00 | 16.97 | −0.03 | −0.176 |
| 10 | 15.80 | 15.79 | −0.01 | −0.063 |
| 11 | 15.60 | 15.59 | −0.01 | −0.064 |
| 12 | 15.40 | 15.39 | −0.01 | −0.065 |
| 13 | 15.20 | 15.20 | +0.00 | +0.000 |
| 14 | 15.00 | 14.97 | −0.03 | −0.200 |
| 15 | 15.80 | 15.80 | +0.00 | +0.000 |
| 16 | 15.75 | 15.77 | +0.02 | +0.127 |
| 17 | 16.15 | 16.15 | +0.00 | +0.000 |
| 18 | 16.30 | 16.30 | +0.00 | +0.000 |
| 19 | 16.42 | 16.44 | +0.02 | +0.122 |
| 20 | 16.00 | 16.00 | +0.00 | +0.000 |
| 21 | 15.90 | 15.93 | +0.03 | +0.189 |
| 22 | 15.70 | 15.71 | +0.01 | +0.064 |
| 23 | 16.85 | 16.86 | +0.01 | +0.059 |
| 24 | 16.50 | 16.50 | +0.00 | +0.000 |
| 25 | 16.65 | 16.64 | −0.01 | −0.060 |
| 26 | 16.10 | 16.13 | +0.03 | +0.186 |
| 27 | 16.15 | 16.17 | +0.02 | +0.124 |
| 28 | 15.10 | 15.08 | −0.02 | −0.132 |
| 29 | 15.95 | 15.97 | +0.02 | +0.125 |
| 30 | 15.50 | 15.49 | −0.01 | −0.065 |
| 31 | 16.30 | 16.29 | −0.01 | −0.061 |
| 32 | 16.30 | 16.29 | −0.01 | −0.061 |
| 33 | 16.30 | 16.29 | −0.01 | −0.061 |
| 34 | 16.30 | 16.30 | +0.00 | +0.000 |
| 35 | 16.30 | 16.29 | −0.01 | −0.061 |
| 36 | 16.40 | 16.39 | −0.01 | −0.061 |
| 37 | 15.00 | 15.02 | +0.02 | +0.133 |
| 38 | 15.60 | 15.57 | −0.03 | −0.192 |
| 39 | 15.90 | 15.91 | +0.01 | +0.063 |
| 40 | 16.25 | 16.26 | +0.01 | +0.062 |
| 41 | 15.40 | 15.40 | +0.00 | +0.000 |
| 42 | 16.50 | 16.52 | +0.02 | +0.121 |
| 43 | 15.10 | 15.11 | +0.01 | +0.066 |

Thus, in accordance with the present invention, there is provided an improved method and apparatus for accurately dosing and dispensing quantities of mercury. The system can be operated either manually or automatically and can achieve accuracies as low as from 0.2-1.0%.

While there have been shown and described what are at present considered to be the preferred embodiments of the invention, it will be apparent to those skilled in the art that various changes and modifications can be made herein without departing from the scope of the invention. The embodiments shown in the drawings and described in the specification are intended to best explain the principles of the invention and its practical application to hereby enable others in the art to best utilize the invention in various embodiments and with various modifications as are suited to the particular use contemplated.

What is claimed is:

1. An apparatus for dosing and dispensing mercury comprising:
   a reservoir containing mercury;
   a capillary tube means having an internal diameter and extending from said reservoir of mercury, said capillary tube means having remotely located ends and an inlet having a diameter less than said internal diameter of said capillary tube means located intermediate said ends, one of said ends located within said reservoir;
   means for adjusting the height of a column of said mercury within said capillary tube means;

means for measuring said height of said mercury column within said capillary tube means; and means for separating and dispensing a predetermined amount of said mercury from said mercury column, said separating and dispensing means including a source of gas supplied to said inlet in said capillary tube means such that said predetermined amount of mercury is separated from said mercury column and dispensed from the other one of said remotely located ends of said capillary tube means.

2. The apparatus of claim 1 wherein said capillary tube means is a single capillary tube.

3. The apparatus of claim 1 wherein said capillary tube means includes first and second capillary tubes having a predetermined internal diameter, one end of each capillary tube being spaced a predetermined distance thereapart and coupled together by a block means.

4. The apparatus of claim 1 wherein said means for adjusting the height of said mercury column within said capillary tube means includes a source of pressurized gas connected to said mercury reservoir.

5. The apparatus of claim 1 wherein said means for measuring said height of said mercury column within said capillary tube means includes a cathetometer.

6. The apparatus of claim 1 wherein said means for measuring said height of said mercury column within said capillary tube means comprises a coaxial capacitor means including a first electrode formed by a metal foil surrounding said capillary tube means and a second electrode formed by said mercury column within said capillary tube means, the output signal of said coaxial capacitor means being proportional to aid height of said mercury column.

7. The apparatus of claim 1 wherein said means for measuring said height of said mercury column within said capillary tube means comprises an electromagnetic coil means surrounding said capillary tube means, the output signal of said electromagnetic coil means being proportional to said height of said mercury column.

8. The apparatus of claim 1 wherein said means for measuring said height of said mercury column within said capillary tube means comprises an optical system means including a light source and a photodetector means arranged on opposite side of said mercury column within said capillary tube means such that the output signal of said photodetector means is inversely proportional to said height of said mercury column.

9. The apparatus of claim 1 wherein said means for measuring said height of said mercury column within said capillary tube means comprises an optical system means including a light source and a photodetector means arranged such that the output signal of said photodetector means is proportional to said height of said mercury column.

10. The apparatus of claim 1 wherein said means for measuring said height of said mercury column within said capillary tube means comprises an optical system means including a TV camera for monitoring said height of said mercury column and a TV monitor for displaying a digitized image of said capillary tube means and said mercury column, said height of said mercury column being determinable by the number of pixels contained within a vertical window superimposed over said image of said mercury column.

11. A method for dosing and dispensing mercury comprising the steps of:

providing a reservoir containing mercury;

providing a capillary tube means having a internal diameter and extending from said reservoir of mercury, said capillary tube means having remotely located ends and an inlet having a diameter less than said internal diameter of said capillary tube means located intermediate said ends, one of said ends located within said reservoir;

adjusting the height of a column of said mercury within said capillary tube means;

measuring a predetermined amount of mercury within said mercury column within said capillary tube means; and supplying a source of gas to said inlet in said capillary tube means such that said predetermined amount of said mercury is separated from said mercury column and dispensed from the other one of said remotely located ends of said capillary tube means.

12. The method of claim 11 including the step of providing a single capillary tube for said capillary tube means.

13. The method of claim 11 including the step of providing first and second capillary tubes having a predetermined internal diameter, spacing one end of each capillary tube a predetermined distance thereapart and coupling said ends together by a block means.

14. The method of claim 11 wherein the step of adjusting the height of the mercury column within the capillary tube means includes the step of providing a source of pressurized gas connected to said mercury reservoir.

15. The method of claim 11 wherein the step of measuring the height of the mercury column within the capillary tube means includes the step of providing a cathetometer.

16. The method of claim 11 wherein the step of measuring the height of the mercury column within the capillary tube means includes the step of providing a coaxial capacitor means including a first electrode formed by a metal foil surrounding the capillary tube means and a second electrode formed by the mercury column within the capillary tube means such that the output signal of the coaxial capacitor means is proportional to the height of the mercury column.

17. The method of claim 11 wherein the step of measuring the height of the mercury column within the capillary tube means includes the step of providing an electromagnetic coil means surrounding the capillary tube means such that the output signal of the electromagnetic coil means is proportional to the height of the mercury column.

18. The method of claim 11 wherein the step of measuring the height of the mercury column within the capillary tube means includes the step of providing an optical system means including a light source and a photodetector means arranged on opposite sides of the mercury column such that the output signal of the photodetector means is inversely proportional to the height of the mercury column.

19. The method of claim 11 wherein the step of measuring the height of the mercury column within the capillary tube means includes the step of providing an optical system means including a light source and a photodetector means arranged such that the output signal of the photodetector means is proportional to the height of the mercury column.

20. The method of claim 11 wherein said step of measuring the height of the mercury column within the capillary tube means includes the step of providing an optical system means including a TV camera for monitoring said height of the mercury column and a TV monitor for displaying a digitized image of the capillary tube means and the mercury column, the height of the mercury column being determinable by the number of pixels contained within a vertical window superimposed over the image of the mercury column.

21. An apparatus for dosing and dispensing a liquid comprising:
- a reservoir containing said liquid and having a first inlet coupled thereto;
- a capillary tube means having an internal diameter and extending from said reservoir of said liquid, said capillary tube means having remotely located ends and a second inlet having a diameter less than said internal diameter of said capillary tube means located intermediate said ends, one of said ends located within said reservoir;
- means for adjusting the height of a column of said liquid within said capillary tube means, said adjusting means including a first source of gas supplied to said first inlet coupled to said reservoir;
- means for measuring said height of said liquid column within said capillary tube means; and
- means for separating and dispensing a predetermined amount of said liquid from said liquid column, said separating and dispensing means including a second source of gas supplied to said second inlet in said capillary tube means such that said predetermined amount of liquid is separated from said liquid column and dispensed from the other one of said remotely located ends of said capillary tube means.

22. An apparatus for dosing and dispensing a substance comprising:
- a reservoir containing said substance;
- a capillary tube means having an internal diameter, said capillary tube means having remotely located ends and an inlet having a diameter less than said internal diameter of said capillary tube means located intermediate said ends, one of said ends adapted to be located within said reservoir;
- means for adjusting the height of a column of said substance within said capillary tube means; and
- means for separating and dispensing a predetermined amount of said substance from said substance column, said separating and dispensing means including a source of gas supplied to said inlet in said capillary tube means such that said predetermined amount of said substance is separated from said substance column and dispensed from the other one of said remotely located ends of said capillary tube means.

23. The apparatus of claim 22 wherein said substance is mercury.

24. A method for dosing and dispensing a substance comprising the steps of:
- providing a reservoir containing said substance;
- providing a capillary tube means having an internal diameter, said capillary tube means having remotely located ends and an having a diameter less than said internal diameter of said capillary tube means located intermediate said ends, one of said ends adapted to be located within said reservoir;
- adjusting the height of a column of said substance within said capillary tube means; and
- supplying a source of gas to said inlet in said capillary tube means such that said predetermined amount of said substance is separated from said substance column and dispensed from the other one of said remotely located ends of said capillary tube means.

25. The method of claim 24 wherein said substance is mercury.

* * * * *